United States Patent [19]

Gregory

[11] Patent Number: 4,941,935
[45] Date of Patent: Jul. 17, 1990

[54] PROCESS FOR HIGH SPEED COATING OF SUBSTRATES

[75] Inventor: Bertram H. Gregory, Aartselaar, Belgium

[73] Assignee: Exxon Chemical Patents Inc., Linden, N.J.

[21] Appl. No.: 269,213

[22] Filed: Nov. 9, 1988

[30] Foreign Application Priority Data

Sep. 11, 1987 [GB] United Kingdom ............... 8726202

[51] Int. Cl.$^5$ ............................................. B29C 47/06
[52] U.S. Cl. ............................ 156/243; 156/244.11; 156/313
[58] Field of Search .............. 156/244.11, 243, 313

[56] References Cited

U.S. PATENT DOCUMENTS

| | | | |
|---|---|---|---|
| 2,721,597 | 3/1973 | Colburn | 156/313 |
| 4,310,578 | 1/1982 | Katsura et al. | 156/334 |
| 4,313,996 | 2/1982 | Newman et al. | 156/313 |
| 4,472,475 | 9/1984 | Decroix | 156/244.11 |

*Primary Examiner*—Caleb Weston
*Attorney, Agent, or Firm*—J. F. Hunt

[57] ABSTRACT

Substrates are coated by a process which comprises co-extruding onto the substrate, e.g. aluminium foil, a layer of an olefin terpolymer and a layer of polypropylene, the olefin terpolymer being adjacent to the substrate and the polypropylene being adjacent to the olefin terpolymer. The olefin terpolymer is a terpolymer of an olefin, e.g. ethylene, an unsaturated carboxylic acid or anhydride, e.g. acrylic acid, and an unsaturated ester, e.g. methyl acrylate, in which the amount of carboxylic acid or anhydride groups in the terpolymer is at least 3 mole % and the amount of ester groups in the terpolymer is at least 3 mole %.

18 Claims, 2 Drawing Sheets

PROCESS FOR HIGH SPEED COATING OF SUBSTRATES

BACKGROUND OF THE INVENTION

This invention relates to a process for the coating of substrates, e.g. metal foils, with polypropylene.

Laminates based on polypropylene and aluminium foil are becoming increasingly important. Compared with polyethylenes, polypropylene provides higher stiffness and tensile strength, a higher melting point (160° C.) and very good resistance to attack by chemicals. For its part aluminium provides an outstanding barrier to gases, moisture and light, does not rust and can be readily shaped into functional products.

Hitherto, the limit to the extended use of processes for laminating polypropylene and metal films such as aluminium has been the relatively poor adhesion of polypropylene to metals for low cost high speed, extrusion coating processes. The chemically modified polyolefins commercially available can adhere to both polypropylene and metals by heat lamination processes. However to develop adequate adhesion the contact time at temperatures in the region of 200° C. has to be at least 20 seconds. This excludes the use of the high speed extrusion coating process where although application temperatures are high, the contact time in the cooling nip is usually a fraction of a second when operating at economic running rates of at least 100 m/min of web.

Various patents have described the coating of substrates such as metal foil with polypropylene, e.g. U.S. Pat. Nos. 4,313,996 and 3,721,597, but none of them teach processes where high speeds of coating of over 50 m/min are possible. Also there is no evidence that good adhesion of the polypropylene to the substrate is achieved and no teaching of the necessity for having certain minimum quantities of acid or anhydride groups and ester groups in the terpolymer.

GB No. 1214820 discloses the use of terpolymers of ethylene and acrylic acid and vinyl acetate in which the total of the non-ethylene monomer is from 20-30 wt. % for adhering polyolefins including polypropylene to vinylidene chloride polymers. Coextrusion is used in the examples. GB No. 1263218, GB No. 1405769, EP No. 2240 discuss the combination of sheets of materials by pressing and heating. DE No. 1669685 disclose how sheets of polypropylene (Example 10) can be joined to steel plate using a sheet made of a mixture of polypropylene and a terpolymer.

There is no disclosure of how a thin layer of tie resin could be coextruded at high speed with polypropylene to provide a strong bond to substrates such as aluminium at high operating speeds. We have now devised a process which enables substrates e.g. metal foil, to be coated with polypropylene at high speed and with good adhesion.

SUMMARY OF THE INVENTION

According to this invention a substrate is coated by a process which comprises co-extruding onto a moving substrate a layer of an olefin terpolymer and a layer of polypropylene, the olefin terpolymer being adjacent to the substrate and the polypropylene being adjacent to the olefin terpolymer. The olefin terpolymer has to be a terpolymer of an olefin, an unsaturated carboxylic acid or anhydride and an unsaturated ester in which the amount of carboxylic acid or anhydride groups in the terpolymer is at least 3 mole % and the amount of ester groups in the terpolymer is at least 3 mole %.

A broad range of substrates can be coated by the process of this invention. Examples are paper, board, calendered paper/board, metals and plastics, e.g. polyolefins and nylon. Suitable metals especially foil, include aluminium and its alloys, copper, bronze, magnesium and its alloys, steel, tin-plate steel, stainless steel and galvanised steel. Especially preferred is aluminium. Also suitable are paper/aluminium foil laminates, for example kraft paper extrusion laminated to aluminium foil.

DESCRIPTION OF THE PREFERRED EMBODIMENTS

Figure 1:
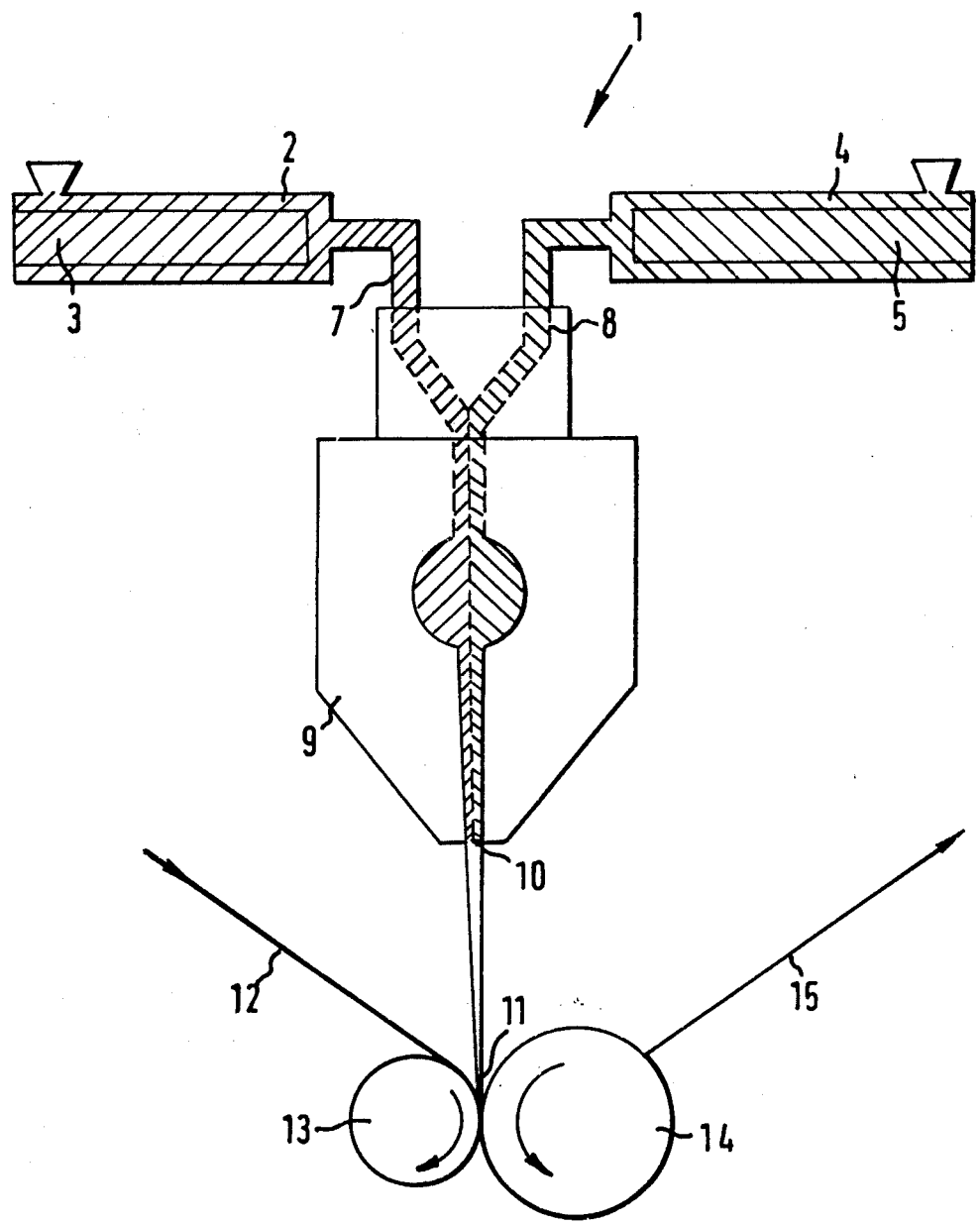
FIG. 1 depicts a co-extrusion machine.

The thickness of the substrate can vary depending on its use and its composition. Since the olefin terpolymer and the polypropylene are co-extruded onto the substrate, for all practical purposes the substrate must be capable of being coiled. Hence the thickness of the substrate may be limited by its composition. For metals, the substrate is conveniently a metal foil and such foils can have thickness varying from 5 to 100 microns for example about 40 microns. Similar thickness are suitable for many other substrates.

The olefin terpolymer acts as a tie resin between the substrate and polypropylene and the olefin from which the olefin terpolymer is derived is preferably of low molecular weight and $C_2$ to $C_5$ olefins are preferred, in particular propylene and especially ethylene.

The unsaturated carboxylic acid is preferably an ethylenically unsaturated carboxylic acid and should contain one or more double bonds. It may be a polycarboxylic acid, e.g. an alph-beta ethylenically unsaturated carboxylic acid preferably containing 4 to 8 carbon atoms e.g. 4 to 6 carbon atoms per molecule, such as maleic acid, fumaric acid or itaconic acid. Preferably however, it is a monocarboxylic acid, e.g. an alpha-beta ethylenically unsaturated carboxylic acid having 3 to 8 carbon atoms, e.g. 3 to 5 carbon atoms per molecule, for instance, acrylic acid, methacrylic acid, crotonic acid or ethacrylic acid. In general ethylenically unsaturated acids having 2 to 5 carbon atoms (not including the acid group carbon(s)) per molecule are preferred.

Acrylic acid is the most preferred acid.

Alternatively an unsaturated carboxylic acid anhydride may be used for example maleic anhydride.

The unsaturated ester may be an ester derived from an unsaturated carboxylic acid or one derived from an unsaturated alcohol. When it is derived from an unsaturated carboxylic acid it is preferably derived from an ethylenically unsaturated carboxylic acid and preferred classes, preferred acids and specific acids are those given above. Particularly preferred esters are those derived from acrylic acid and methacrylic acid. Suitable alcohols from which these esters are derived include monohydric and less desirably polyhydric alcohols. Examples of suitable monohydric alcohols are $C_1$ to $C_{10}$ aliphatic alcohols, for example methanol, ethanol, isobutanol and n-hexanol.

The esters could be derived from alcohols containing an aryl group, e.g. benzyl alcohol or 4-phenyl-butanol- 1. Examples of diyhydric and trihydric alcohols are ethylene glycol and glycerol.

The most suitable examples of esters derived from ethylenically unsaturated carboxylic acid are $C_1$-$C_{10}$ alkyl acrylates and methacrylates, e.g. methyl, ethyl and n-butyl acrylate and methyl, ethyl and n-butyl methacrylates.

Other possible esters are those derived from unsaturated alcohols and saturated acids. The unsaturated alcohol may for example be vinyl alcohol or allyl alcohol. The saturated acid is preferably a monocarboxylic acid, for example a $C_1$ to $C_{10}$ monocarboxylic acid such as acetic acid, propionic acid, n-hexanoic acid or phenyl acetic acid.

Less desirably the ester is derived from a polycarboxylic acid e.g. oxalic acid or succinic acid. The more suitable ester is vinyl acetate.

The most preferred copolymers are terpolymers of ethylene, methyl acrylate and acrylic acid and of ethylene, methyl methacrylate and methacrylic acid.

In order to act effectively as a tie resin there must be minimum of 3 mole % of carboxylic acid or anhydride groups and 3 mole % of ester groups in the terpolymer. It is preferred that the amount of olefin is 80 to 94 mole %, for example about 92 mole %. For the other monomers, the preferred amounts are each 3 to 5 mole %, e.g. about 4 mole %.

It is usual for the melt index (dg/min at 190° C.) to be between 2 and 20, especially between 4 and 7.

For good melt stability and drawdown in the extrusion coating process it is highly desirable that the melt flow rate should be in the range of 10-40 dg/min at 230° C. (2.16 kg), for example from 20 to 30 dg/min at 230° C. (2.15 kg).

Other physical property ranges are usually as follows:

| Melting[(1)]: | Peak °C. | 60 to 100 preferably 65 to 85 |
|---|---|---|
| Crystallisation[(1)]: | Peak °C. | 45 to 75 preferably 50 to 70 |
| Ultimate Tensile: | (M.Pa) | typically 10 to 20 |
| Elongation at Break: | (%) | typically 300 to 600 |

[(1)]Melting and Crystallisation properties are measured by Differential Scanning Calorimetry (DSC) as per ASTM D 3417 at 10° C. per minute heating rate.

The terpolymers are usually prepared by polymerising the monomers in bulk at high pressure, usually 1500 to 2500 bars, at a temperatures usually between 150° C. and 250° C. preferably between 190° C. and 220° C., using a free radical initiator. Suitable initiators are peroxyesters such as peroxypivalates, peroctoates or perbenzoates or a mixture of these or peroxides.

The polymerisation reaction can be continuous and the product can be continually withdrawn from the reactor as it is formed. The viscosity of the product is controlled by using a transfer agent such as isobutylene. Other suitable transfer agents are compounds such as an alcohol, a ketone, an aldeyde or an aliphatic or aromatic hydrocarbon.

The layer which is adjacent to the tie-resin is polypropylene. Various forms of polypropylene can be used, for example isotactic polypropylene usually having a density of from 0.86 to 0.91 g/cm$^3$ and a molecular weight of from 50,000 to 500,000 as determined by the intrinsic viscosity method. It can also be biorientated polypropylene, uniaxially stretched polypropylene film or cast (unstretched) polypropylene film.

Preferably the polypropylene should have a melt flow rate of from 30 to 50 dg/min, e.g. about 40 dg/min to ensure a good rheology match with the tie-resin.

Typical properties of polypropylene are as follows:

| Density | 0.905 g/cm$^3$ |
|---|---|
| Vicat softening point | 155° C. |
| Tensile yield | 35 N/mm$^2$ |
| Tensile modulus | 1600 N/mm$^2$ |
| Flexural modulus | 1500 N/mm$^2$ |
| Elongation at yield | 10% |
| Izod Impact Strength | 40 J/m at 23° C. |

The tie-resin (i.e. the olefin terpolymer) and polypropylene are co-extruded onto the moving substrate. This co-extrusion can be achieved by the use of a co-extrusion machine having two extruders, a main extruder for the polypropylene and a satellite extruder for the olefin terpolymer. It is preferred to employ a combining feedblock system rather than a dual manifold die. Both extruders are usually set at about the same temperature, typically 270° to 290° C. and the coating thickness can be controlled by the extruder screw speed and the web transport rate.

The substrate to be coated (e.g. aluminium foil) is preferably fed from an unwinder into the coating nip of the co-extruder machine. Preferably the temperature of the chill roll with which the polypropylene is in contact is set at 35° to 45° C., e.g. about 40° C.

The molten co-extruded web is fed tangentially onto the moving substrate substrate feeding into the nip where the molten extrudate is pressed onto the substrate. The air gap (the distance between the die exit and nip) should preferably be about 100 mm.

When the substrate comprises aluminium it is desirable to subject the aluminium surface to corona treatment prior to its entry into the coating nip.

The coated substrate can be edge trimmed and wound onto rolls using tension controlled winding systems.

If desired both surfaces of the substrate can be coated by the co-extruded olefin terpolymer and polypropylene. To achieve this two co-extrusion machines designed to operate in tandem are used. Another way is to pass the coated substrate a second time through the same machine ensuring that the sides are reversed.

The thickness of the tie-resin using a dual manifold die can be as thin as 5 microns. A typical product is one which an aluminium foil of thickness about 40 microns is coated with an ethylene terpolymer layer of thickness about 5 microns and a polypropylene layer of thickness about 30 microns.

By the process of this invention it is possible to achieve coating speeds of at least 100 m/min and even above about 200 m/min such as from 300 to 400 m/min. At the same time one can achieve adhesion values of at least 400 g/15 mm width of specimen and even up to 800 g/15 mm. The time available for adhering the layers together is inversely related to the line speed and may be from 0.1 to 0.5 seconds.

The process of this invention which enables one to apply polypropylene at high speed onto a wide range of substrates ranging from paper and board to plastics and metals has great advantages over prior art processes. Hitherto coating by polypropylene has been limited by the fact that no adhesion to any substrate is sufficiently porous to allow the polypropylene melt to penetrate into its pores and this has limited the substrate to fabrics and porous papers. Also in the past, due to the fact that the rheological properties inherent in polypropylene (PP) result in poor melt stability in the extrusion coating process, line speeds have been restricted to a maximum of 50 m/min whereas for low density polyethylene (LDPE) the line speeds can be several hundred m/min. Surprisingly, with the invention the tie-resin layer supports the PP in the air gap sufficiently to stabilize the PP melt stream and permit the higher line speeds referred to previously. To overcome this limitation blends of PP with inter alia LDPE have been developed but this dilutes the PP properties and increases the fabricating cost. Dilution of PP properties is a disadvantage because compared with LDPE, ethylene/vinyl acetate copolymers, ethylene/acrylic acid copolymers, ethylene/methyl acrylate copolymers and ionomers commonly used in the extrusion coating process, PP has the following advantages: higher heat resistance, a better barrier to gases and moisture; excellent resistance to oils and fats; greater stiffness, hardness and abrasion resistance, and good surface release properties.

The invention is now described with reference to the following Examples.

EXAMPLE

A paper/foil laminate was coated with polypropylene using a co-extrusion machine illustrated diagrammatically in FIG. 1 of the accompanying drawings.

Referring to FIG. 1 the co-extrusion machine 1 comprised a satellite extruder 2 containing granules of the olefin terpolymer tie-resin 3 and a main extruder 4 containing granules of polypropylene 5.

The extruded resins passed through conduits 7 and 8 and combined in a die 9 and the combined co-extrudate emerged at 10 and passed to a coating nip 11 where it came in contact with the laminate (substrate) 12 fed from an unwinder (not shown). The machine had a standard rubber nip roll 13 and a matte chill roll 14 assembly. The laminate (substrate) coated with tie-resin/polypropylene extrudate 15 passed from the chill roll 14 to be wound on a drum (not shown).

The diameters of the extruders 2 and 4 were respectively 63.5 mm and 88.9 mm and their temperatures held at 275° C. The layer thicknesses were controlled by the extruder screw speeds or output of each extruder to produce a web transport speed of 100 m/min.

The die 9 was 650 mm wide, deckled down to 500 mm at 10. An air gap between nip 13 and 14 and die exit of 110 mm was to maximise adhesion. The temperature of the chill roll 14 was raised to 40° C. Since the polypropylene was in contact with the surface of the chill roll 14, no sticking occurred.

All the operating conditions were controlled and monitored by a microcomputer linked to the machine 1.

The tie-resin 3 was a terpolymer of ethylene, acrylic acid and methyl acrylate of the following composition:

| Monomer | Moles % |
| --- | --- |
| ethylene | 94 |
| acrylic acid | 3 |
| methylacrylate | 3 | and its melt index was 5.5 dg/min (190° C.).

The polypropylene 5 had the following physical characteristics:

| | |
| --- | --- |
| Melt flow rate | 40 dg/min (230° C./2.16 kg) |
| Density | 0.905 g/cm$^2$ |
| Vicat softening point | 100° C. |

The laminate (substrate) was 35 gsm bleached kraft paper extrusion laminated to 9 micron aluminium foil, corona treated.

The above procedure was repeated using 40 micron aluminium foil instead of the laminate, extruder temperatures of 285° C. and different thicknesses of tie-resin and polypropylene.

The results obtained are shown in Table 1 after adhesion measurements had been carried out. The peel adhesion (180°) was determined on 15 mm wide specimens at ambient temperature after aging for 8 days. The extension rate of the Instron tensometer was 500 mm/min.

TABLE 1

Adhesion Tests
PP Co-Extrusion coated with Tie-Resin on Aluminium Foil
Line Speed 100 m/min   Air Gap 110 mm   Corona Treated

| Substrate | Weight TR | gsm PP | Adhesion 275 C | g/15 mm 285 C |
| --- | --- | --- | --- | --- |
| Paper/Foil | 5 | 15 | 570 | 620 |
| Paper/Foil | 5 | 35 | 460(180) | 590(220) |
| Paper/Foil | 10 | 50 | 800(200) | 820(180) |
| 40 Al Foil | 5 | 35 | | (210) |

( ) Adhesion between PP and tie-resin interface.
TR: Co-extrusion tie-resin.

The adhesion values in Table 1, show that with as little as 5 grams/m$^2$ (4.8 microns) tie-resin, peel adhesion values up to 800 g/15 mm width are developed. The PP, tie-layer interface developed average values of 200 g/15 mm.

The adhesion to the 40 micron Al foil was so high at 285° C., that only the PP layer could be stripped off.

Heat seal was determined over the temperature range 160°–200° C. Both sealing jaws were heated and dwell time was fixed at 0.5 sec. The samples were conditioned for 24 hrs. and the peel strength to break the seals were measured on an Instron at an extension rate of 500 mm/min.

Figure 2:
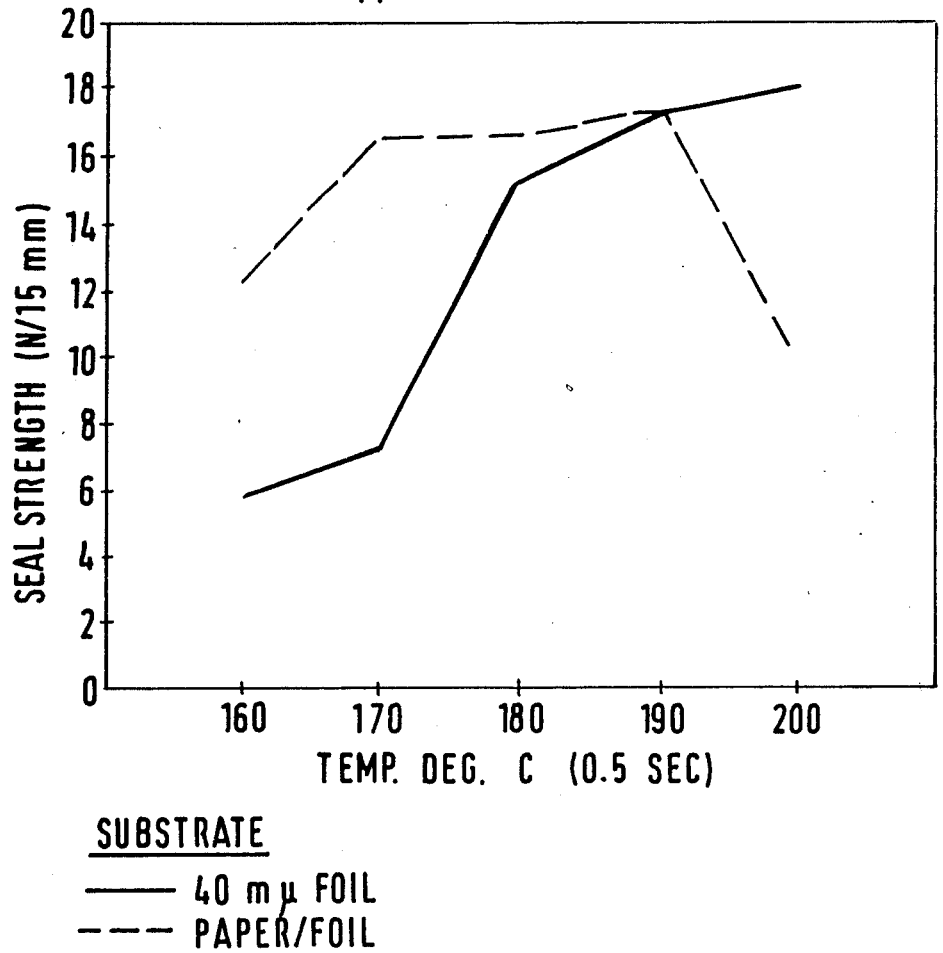
FIG. 2 is a plot of seal strength against seal temperature for coating polypropylene onto foils at 0.5 second seal time.

The measurements are shown in FIG. 2. The seal strength values were typically 16 N for 15 mm wide specimens. With PP as the seal layer, minimum jaw temperatures of 175° C. are required. Failure occurred at the PP/tie-resin interface as the seal ruptured.

We claim:
1. A process for high speed coating a substrate moving at a line speed of over 50 m/min comprising co-extruding onto the substrate a layer of an olefin terpolymer tie resin and a layer of polypropylene by combining the terpolymer and polypropylene layers to form a molten co-extruded web and contacting said molten co-extruded web with said substrate, the olefin terpolymer tie resin being between the substrate and the polypropylene wherein the olefin terpolymer tie resin is a terpolymer of ethylene or propylene, an unsaturated carboxylic acid having 3 to 8 carbon atoms or an anhydride having 4 to 8 carbon atoms and an unsaturated ester; provided, the amount of carboxylic acid or anhydride groups in the terpolymer is at least 3 mole % and the amount of ester groups in the terpolymer is at least 3 mole %.

2. A process according to claim 1 wherein the substrate is aluminum foil or a paper/aluminum foil laminate.

3. A process according to either of claims 1 and 2 wherein the terpolymer is an ethylene terpolymer.

4. A process according to claim 3 wherein the carboxylic acid of the terpolymer is acrylic acid or methacrylic acid.

5. A process according to claim 3 wherein the ester is a $C_1$ to $C_{10}$ alkyl acrylate or methacrylate.

6. A process according to claim 3 in which the amount of carboxylic acid or anhydride groups containing monomer in the terpolymer is from 5 to 10 wt % and the amount of ester group containing monomer is from 5 to 10 wt %.

7. A process according to claim 1 wherein the melt flow rate of the terpolymer is in the range of 10–40 dg/min at 250° C. (2.16 kg).

8. The process of claim 7 wherein the melt flow rate of the terpolymer is in the range of 20–30 dg/min at 250° C. (2.16 kg.).

9. The process of claim 1 wherein the terpolymer has a melt index of 2–20 dg/min (at 190° C.).

10. The process of claim 9 wherein the terpolymer has a melt index of 4–7 dg/min (at 190° C.).

11. The process of claim 1 wherein said molten co-extruded web is contacted with said substrate over a nip roll and through a nip formed with a chill roll.

12. The process of claim 11 wherein said substrate is aluminum foil or a paper/aluminum foil laminate and the distance between the die exist and the nip is about 100 mm.

13. The process of claim 1 wherein the co-extrusion is attained by the use of a co-extrusion machine having a main extruder for the polypropylene and a satellite extruder for the terpolymer and using a combining feed block system.

14. The process of claim 1 wherein the line speed is at least 100 m/min.

15. The process of claim 1 wherein the line speed is over 200 m/min.

16. The process of claim 1 wherein the line speed is 300–400 m/min.

17. A process for coating a substrate moving at a rate of from about 100 m/min to 400 m/min with polypropylene through an olefin terpolymer tie resin which comprises co-extruding onto the substrate, polypropylene and the olefin terpolymer tie resin between the substrate and polypropylene wherein the tie resin is a terpolymer, having a melt index between 4 and 7 dg/min (190° C.), comprising from 80 to 94 mole % ethylene, 3 to 10 mole % acrylic acid or methacrylic acid, and 3 to 10 mole % vinyl acetate, methyl acrylate, or methyl methacrylate.

18. The process of claim 8 wherein the terpolymer tie resin comprises about 94 mole % ethylene, about 3 mole % acrylic acid, and about 3 mole % methacrylate and the substrate is aluminum foil.

* * * * *